March 2, 1965 K. REUSCHEL ETAL 3,171,755

SURFACE TREATMENT OF HIGH-PURITY SEMICONDUCTOR BODIES

Filed May 9, 1963

3 Sheets-Sheet 1

March 2, 1965 K. REUSCHEL ETAL 3,171,755

SURFACE TREATMENT OF HIGH-PURITY SEMICONDUCTOR BODIES

Filed May 9, 1963 3 Sheets-Sheet 2

March 2, 1965 K. REUSCHEL ETAL 3,171,755

SURFACE TREATMENT OF HIGH-PURITY SEMICONDUCTOR BODIES

Filed May 9, 1963 3 Sheets-Sheet 3

United States Patent Office 3,171,755
Patented Mar. 2, 1965

3,171,755
SURFACE TREATMENT OF HIGH-PURITY SEMICONDUCTOR BODIES

Konrad Reuschel, Pretzfeld, Upper Franconia, Germany, Heinrich Gutsche, Danville, Pa., and Arno Kersting, Pretzfeld, Upper Franconia, Germany, assignors to Siemens-Schuckertwerke Aktiengesellschaft, Berlin-Siemensstadt, Germany, a corporation of Germany Filed May 9, 1963, Ser. No. 281,857
Claims priority, application Germany, May 16, 1958, S 28,239/58
6 Claims. (Cl. 117—200)

Figures 1, 2:
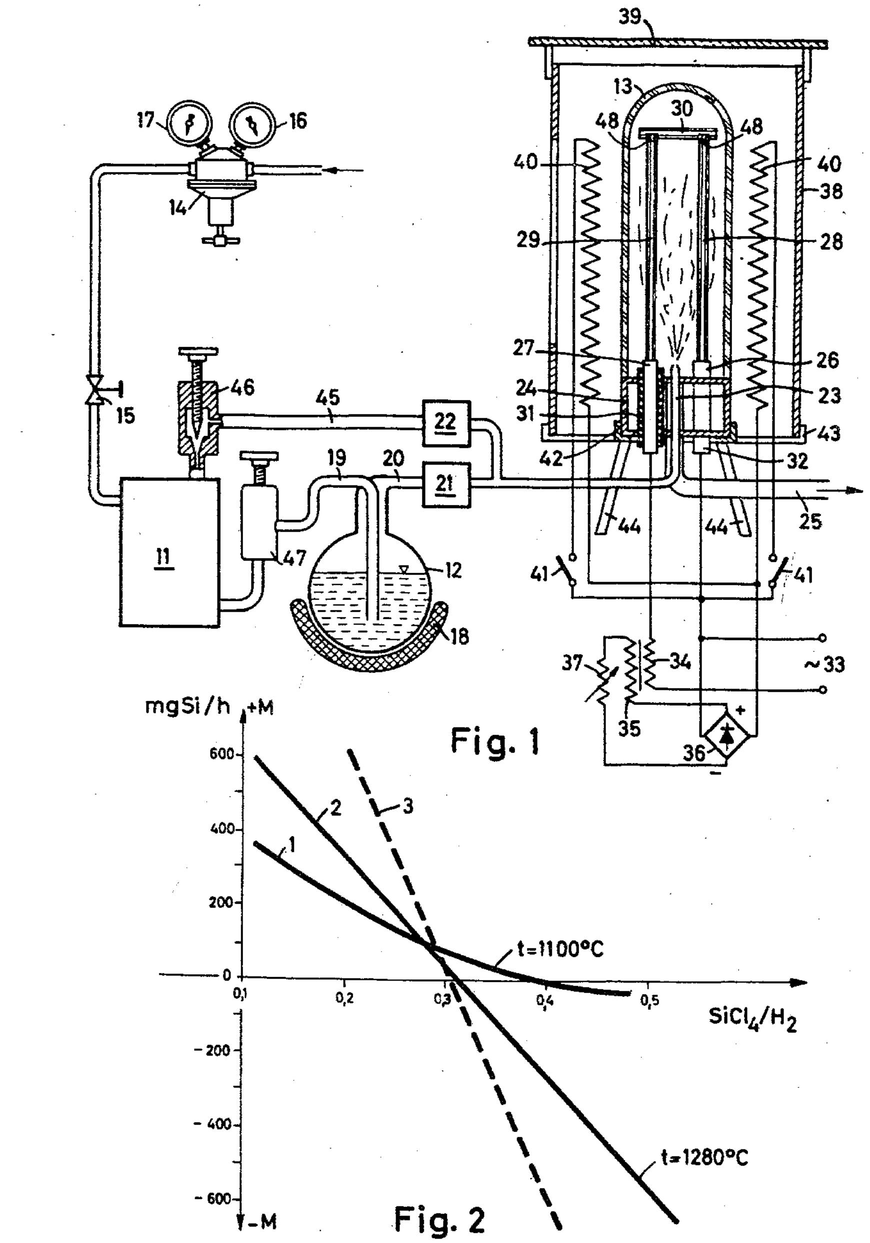

Our invention relates to a method for the surface treatment of bodies consisting of highly purified semiconductor material for the manufacture of electronic semiconductor devices such as rectifiers, transistors and the like and is a continuation-in-part of Serial No. 813,583, filed May 15, 1959, and now abandoned. In a more specific aspect, our invention is an improvement in and is related to a prior method in which a semiconductor material, such as silicon, is precipitated upon an electrically heated body of the same semiconducting material, from a flowing mixture of a gaseous compound, preferably, a halogenide of the semiconductor material, and a gaseous reaction agent, particularly hydrogen. The precipitation is a result of a chemical reaction of the gaseous compound, particularly reduction.

According to the present invention, the reaction conditions are modified particularly by increasing the temperature of the semiconductor body and/or by increasing the molar ratio of the semiconductor compound. The reaction conditions are changed in such a manner that the semiconductor substance is removed from the heated semiconductor body by its reaction with the gaseous semiconductor compound. As a result, a purification of the surface is achieved which is similar to that obtainable by the known chemical and electrolytical etching methods. The known etching methods have the disadvantage that the semiconductor body must be placed into a special container, in some cases several times, where it can come into contact with foreign substances. Such processes and manipulations entail the danger of undesired contamination of the semiconductor substance. This danger is eliminated by the novel surface treatment carried out in accordance with the instant invention, because, for the purpose of eliminating surface material, the semiconductor substance is not brought into contact with foreign substances but encounters only those substances from which it originated.

As indicated above, it is known to produce semiconductor material of extremely high degree of purity by precipitating it from a gaseous semiconductor compound, particularly from a halogenide of the particular semiconductor substance, onto a hot surface by reduction, particularly onto the surface of a preferably electrically heated body of the same semiconductor material, with the result of increasing the volume of this body. Thus for example, a silicon rod with an original diameter of 3 mm. can be thickened to a diameter of about 30 mm. and more by heating the semiconductor body by electric current up to 1000 to 1350° C. for example, and subjecting it to a gas current consisting of a mixture of silicon tetrachloride and hydrogen in a mole ratio of $SiCl_4$ to $H_2$ smaller than .03. Also applicable for this purpose is a mixture of silico-chloroform and hydrogen in a mole ratio $SiHCl_3$ to $H_2$ less than 0.5 at a rod temperature of 900 to 1350° C. Pure silicon has also been produced from silicon iodide and monosilane by thermal decomposition and deposition onto a hot surface. It has further become known to convert heated silicon by treatment with gaseous silicon tetrachloride into a volatile compound, and thus completely vaporizing away the solid silicon body. In contrast thereto, the novel method of the present invention consists in a surface treatment for the purpose of a purification analogous to that obtained by etching.

Figure 3:
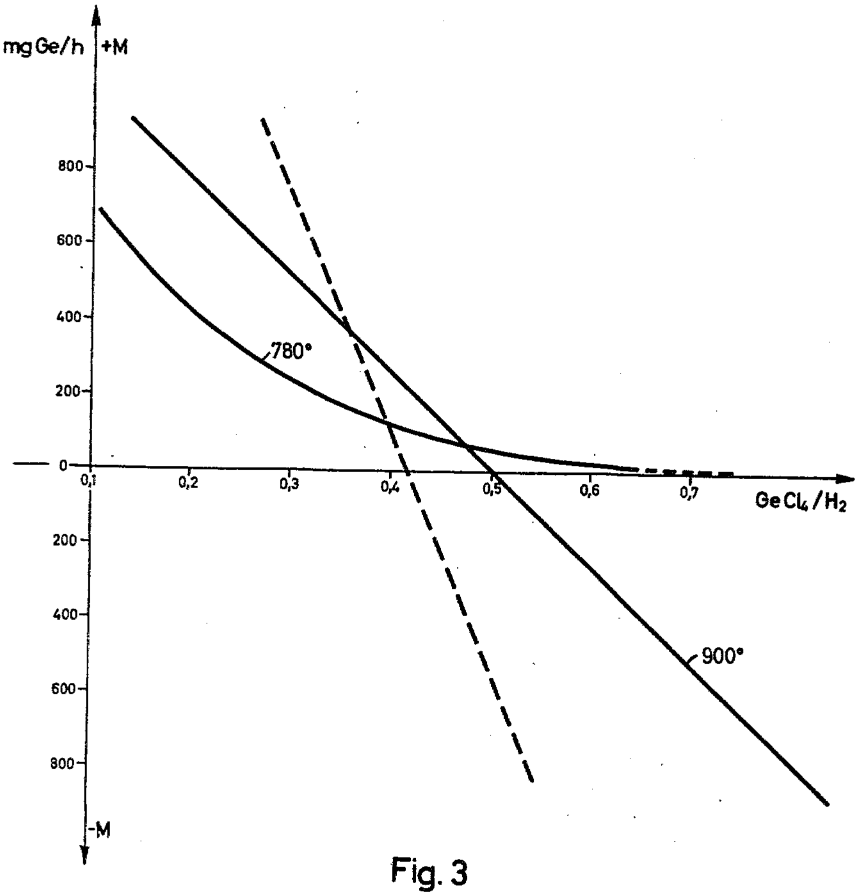
Figure 4:
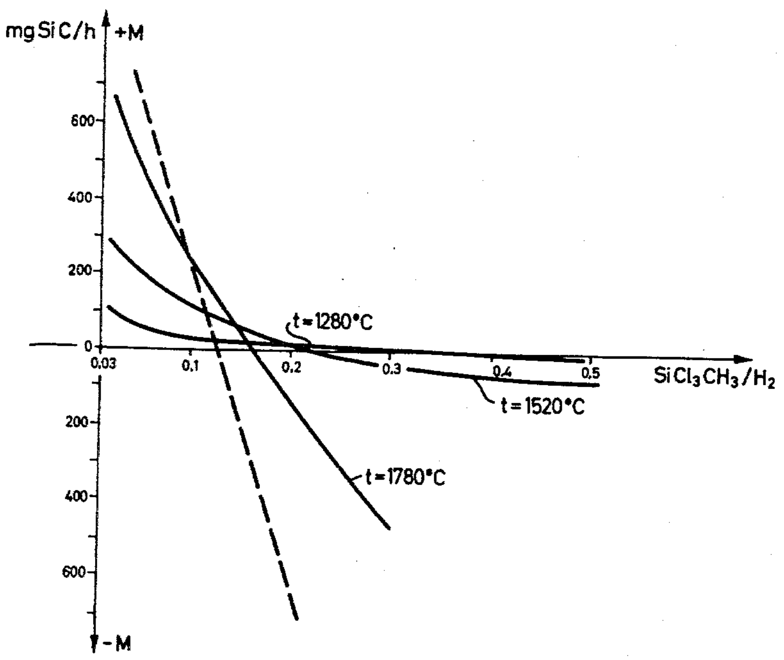

Fundamentally, the method according to the invention can be carried out with most of the known reaction processes, provided that the reaction conditions are suitably modified. In the following description, an embodiment of the novel method is explained, by way of example, with reference to the accompanying drawing, according to which a monocrystalline rod of silicon of the highest-purity is surface-treated with a flowing mixture of silicon tetrachloride and hydrogen, the hydrogen serving as a carrier gas as well as a reaction agent. In the drawing:

FIG. 1 is a vertical, schematic view, partly in section, of an apparatus for performing the method, FIG. 2 is a coordinate graph explaining the operation with reference to silicon, FIG. 3 is a coordinate graph explaining the operation with reference to germainium, and FIG. 4 is a coordinate graph explaining the operation with reference to silicon carbide.

The device shown in FIG. 1 serves for producing high-purity silicon by precipitating it from a gaseous compound, the general design of the device, in principle, being known for example from the article by H. C. Theuerer, Purification of Silicon, in the periodical "Bell Laboratories Record," vol. 33, pages 327 to 330. Improved special designs of such equipment are disclosed in the co-pending applications Serial No. 665,086, filed June 11, 1957, now Patent No. 3,011,877, and Serial No. 737,254, filed May 23, 1958, now Patent No. 3,042,494.

The apparatus shown in FIG. 1 comprises three main components, namely, a conventional column 11 for chemical purification and drying of the hydrogen, a storage tank 12 for a silicon halogenide, particularly silicon tetrachloride, with which the hydrogen passing through the tank 12 charges itself, and a reaction vessel 13 preferably of transparent material, for example quartz or glass. The pre-purified hydrogen is supplied from one or more containers which are not illustrated, and passes through a reduction valve 14 and a check valve 15 to the purifying column 11. As usual, the reduction valve 14 is equipped with a high-pressure monometer 16 and a low-pressure monometer 17. The valve 14 reduces the storage pressure of the hydrogen to a value only slightly above normal atmospheric pressure. From purifying column 11, the hydrogen is led by means of an immersion pipe 19 into the storage tank 12. The tank is provided with an electric heating device 18 whose heating power is preferably adjustable. By virtue of such adjustment and also by variably adjusting the height of the outlet opening of immersion tube 19 beneath, or above, the liquid level in tank 12, any desired mixing ratio of the gas mixture can be obtained.

An outlet pipe 20 passes the mixture through a flow meter 21 to the inlet nozzle 23 of the reaction vessel, the nozzle being mounted in a base structure 24 which may consist of metal, for example silver, and may be hollow so that it can be cooled by a flow of cooling liquid, such as water. Mounted in the base structure is an exhaust pipe 25 for the spent gases. Secured to the base are holders 26 and 27 for two silicon rods 28 and 29 respectively. The upper ends of the two silicon rods 28 and 29 are connected with each other by a current-conducting bridge 30 which may consist either of a piece of silicon or of carbon (spectral carbon) or graphite of highest available purity. It has been found that the use of carbon (spectral carbon), or graphite pressed into a sleeve of silver, is advantageously suitable as material for the holders 26 and 27. The holder 27 is insulated from the metal foot structure 24 by means of an insulating sleeve 31 and passes through the sleeve to the outside of the reaction vessel, where a current lead for the direct electrical heating of the silicon rods 28 and 29 is connected. The other current supply lead is attached to a terminal 32 directly joined with the metal foot structure 24 with which the holder 26 is in electrically conducting connection.

Heating power is supplied from an alternating current source at 33 through an iron-cored reactor 34 whose effective inductivity is variable by means of a pre-magnetizing winding 35. The pre-magnetizing winding 35 is excited by adjustable direct current voltage which in the illustrated embodiment is also derived from the alternating current source 33 through a full-wave rectifier 36 and an adjustable resistor 37. By varying the pre-magnetizing current supplied to the winding 35, the temperature of the silicon rods 28 and 29 can be adjusted as desired and can be kept constant during operation of the apparatus by adapting the heating power to the cross-sectional variation of the silicon rods.

The reaction chamber is enclosed by a reflector 38 consisting of a cylindrical metal sheet and possessing one or more observation slots such as the one shown at 31*a*. Through these slots the temperature of the silicon rods can be continuously observed by means of a pyrometer. A cover 39 of adjustable opening width can be placed upon the top of the reflector cylinder 38. The inner wall of the reflector 38 may further be provided with heating rods 40 by means of which, when starting the operation, the cold silicon rods 28 and 29 can be heated up to a temperature at which their electrical conductance becomes high enough to permit further heating by current flowing through the rods 28, 29 from the current source 33. The heating resistors 40 may likewise be energized from the current source 33 and are put into and out of operation under control by switches 41. The reflector 38 and the base 24 of the reaction vessel rest upon a carrying structure composed of a ring 42 which has several radial arms 43 and downwardly extending legs 44 so that the ambient air has access to the vessel from below, and can pass all around the reaction vessel 13.

A by-pass line 45 is provided for varying the volumetric ratio. The line 45 permits the supplying of hydrogen from the purifying column 11 directly to the inlet nozzle 23 of the reaction vessel. A needle valve 46 permits adjusting and varying the quantity of volume of flow per hour in the by-pass line 45. A similar needle valve 41 may also be provided in the pipe connection 19. Flow meters 21 and 22 of conventional design are provided in line 20 and line 45 respectively. By adjusting the needle valves 46 and 47, the mole ratio of the mixture components $SiCl_4$ to $H_2$ can be varied within wide limits. The resulting mole ratio obtaining at any one time is to be determined from the indications of the respective flow meters 21 and 22.

The test results reported below, and illustrated in FIG. 2, were obtained with an apparatus according to FIG. 1 in which the reaction vessel 13 had a diameter of approximately 8 cm. and a height of approximately 50 cm. The silicon rods had a diameter of about 3 mm. and 30 cm. length. Operating with an hourly throughput of approximately 40 liters of hydrogen, the curves indicated in FIG. 2 were obtained.

The curves in FIG. 2 indicate, in dependence upon different values of the mole ratio $SiCl_4$ to $H_2$, the amounts of silicon deposited per hour (+M) upon the silicon rods, these values being entered on the ordinate from the origin upwardly. The curves further indicate, as (−M), the amounts of silicon carried off the silicon rods per hour, these values being entered from the origin downwardly. Curve 1 was taken with a rod temperature of about 1100° C., curve 2 with a rod temperature of about 1280° C. Curve 1 shows that with a rod temperature of 1100° C. a deposition of appreciable quantities can be attained with a molar ratio smaller than 0.3. However, thinning down of the silicon rod, by removal of silicon, is not feasible at this temperature. According to curve 2, greater quantities of silicon are deposited with a molar ratio smaller than 0.3; however, at the same temperature considerable quantities of silicon are carried off the rods if the value of the molar ratio is considerably greater than 0.3. For still higher rod temperatures near the melting point (about 1420° C.) of the silicon, the resulting curves approach the one shown by a broken line and designated as 3.

An outstanding advantage of such a removal of semiconductor substance is the fact that it results in the purifying of the surface of the silicon rods in a manner similar to etching, but without requiring that the silicon rods be removed from the reaction vessel and without the necessity of introducing detrimental foreign substances into the reaction vessel. For example, in a process in which silicon is deposited from a gaseous phase condition onto thin silicon rods, such thin rods, immediately after having been inserted into the apparatus, can first be purified before the thickening of the rods is initiated, by corresponding modification of the reaction conditions. This has the special advantage of affording the greatest degree of security from retaining, in the subsequent deposition step, undesired foreign substances that may have contacted the surface of the original rods while the rods were stored or being manipulated outside of the reaction vessel. Furthermore, when terminating the silicon precipitating process, an ultimate purification of the surface can be obtained by an opposite change of the reaction conditions resulting in a final "etching" of the surface.

The described change of the reaction performance permits achieving further special advantages if the monocrystalline silicon rods used as a carrier for the deposited substance have one of their crystal axes, preferably the (111) axis oriented in the direction of the rod axis. In this case, the elimination of a surface layer down to 0.2 mm. by the method according to the invention has the effect of exposing crystal areas that are to a great extent free of defects. This elimination is preferably effected with a mole ratio greater than 0.3 and a rod temperature of 1200° C. When thereafter the course of the reaction is changed so that the rod is thickened by applying a mole ratio smaller than 0.3 and a temperature between 1000 and 1350° C., then the resulting products are monocrystalline rods of relatively great thickness, for example 10 mm. diameter and more. In this manner a separate processing step heretofore necessary is obviated, for example the step of producing monocrystalline rods with the aid of a monocrystalline germ by pulling the rod out of the melt, or by means of crucible-free zone pulling.

The monocrystalline original rods which, after eliminating a thin surface layer, are used as a carrier for the silicon substance to be deposited from the vaporous phase may be obtained, according to a prior disclosure, from relatively thick rods by pulling them thin in accordance with the crucible-free zone pulling method. This is done by continuously increasing the mutual distance of the rod holders during the pulling operation, with the result that the cross section of the rod is reduced.

Under some conditions disturbances may occur during the thickening process, with the result that the rods will continue to grow not monocrystalline but polycrystalline, at least at some localities. For example, such disturbances may be caused by inadvertent interruptions or reductions in the heating power applied to the rod, or inadvertent or accidental changes of the composition of the gaseous mixture or of the quantity of mixture passing through the vessel. Such disturbances, too, can be eliminated by the above-described alternation or change in the reaction conditions. This is done by first eliminating a thin surface layer in order to again expose defection-free crystal areas, and then restoring the original reaction conditions in order to continue the desired monocrystalline growths by deposition of substance from the gaseous mixture.

The apparatus illustrated in FIG. 1 has also been used for the surface treatment of silicon rods with the aid of a silicon compound other than $SiCl_4$, namely $SiHCl_3$. It was found in this case that the elimination of silicon material requires a higher mole ratio of $SiHCl_3$ to $H_2$, namely such that, in a diagram corresponding to FIG. 2, the intersection points of the illustrated curves with the abscissa are located further toward the right, that is at about the value 0.5. The elimination of material from the silicon rods was found to proceed more slowly but could be augmented and accelerated by the presence of HCl. For this purpose steam ($H_2O$) was added to the gas mixture. A portion of the gas mixture reacted in accordance with the following reaction formula:

$$2SiCl_3H+3H_2O \rightarrow H_2Si_2O_3+6HCl$$

It has been found preferable to let the change of the reaction conditions from "etching" to depositing occur gradually, not abruptly. This is carried out by continuous change of the mole ratio and/or the rod temperature. This greatly increases the reproducibility of the desired course of the etching process and more reliably secures the obtaining of a defection-free growth of the monocrystalline rod.

To avoid the occurrence of the above-mentioned disturbances, it is also desirable to make certain that the heated rods are not subjected to mechanical tension during any portion of the depositing process. For that reason, the current conducting bridge 30, which is mounted upon the rods when they are being inserted into the apparatus, must not be too heavy. The bridge should further be mounted in such a manner that it is displaceable at least with respect to one of the two thin carrier rods 28, 29. This can be done by grinding a notch into the front face at the top end of at least one of the two carrier rods, and placing the bridge 30 loosely into the notch. The bridge consists preferably of a piece of silicon of approximately the same thickness as the original carrier rods 28, 29.

During the depositing process the bridge 30 firmly coalesces with the rod ends due to silicon being precipitated onto the bridge. It is therefore recommended, for avoiding tensions in the texture which may otherwise occur during the process, to keep the rod temperature as constant as possible during the entire duration of the process. For this purpose the temperature can be automatically regulated to a constant value, for example with the aid of a total-radiation pyrometer serving as a measuring probe. As a result, the electric heating power applied to the rods is continuously increased in accordance with the increasing thickness of the rods, for example by continuous adjustment of the resistor 37 under control by the pyrometer. It follows from the foregoing that it is preferable to perform the entire process as much as possible in a continuous performance without innterruption.

While the novel method according to the invention was explained above with reference to silicon, it is analogously also applicable to other semiconductor materials from the fourth group of the periodic system, for example germanium and silicon carbide.

FIG. 3 shows the analogous graph for germanium as was shown in FIG. 2 for silicon. Germanium has a melting point of 958.5° C. as contrasted to the melting point of silicon of 1420° C. The two solid-line curves respectively show the rates of deposition at rod temperatures of 780° and 900° C. The broken line shows the resulting curves as one approaches the melting point. It can be readily seen from FIG. 3 as one approaches a mole ratio of 0.5 for $GeCl_4/H_2$ at a temperature above 900° C., that germanium is removed from the semiconductor rod, in analogous manner as shown in FIG. 2. At the melting point the critical ratio is about 0.42.

FIG. 4 relates to silicon carbide. In contrast to FIGS. 2 and 3 which relate to silicon and germanium respectively, the broken line in FIG. 4 relates not to the melting temperature of the material but rather to the sublimation temperature. This is about 2100° C. for silicon carbide. At and above this temperature limit carbon precipitates, that is, silicon carbide is no longer stable.

While the results of FIG. 3 were obtained by using apparatus and conditions similar to those described with reference to silicon, a slight variation occurred when carrying out the process with silicon carbide. The diameter of the reaction vessel was 12.5 cm. and the height approximately 50 cm. The carrier rods consisted of silicon having a diameter of 4 mm. and a 25 cm. length. The operation was carried out with an hourly throughput of approximately 50 liters of hydrogen per hour using as a starting material monomethyl trichlorosilane, $SiCl_3CH_3$. The results of the tests carried out at different temperatures are shown in FIG. 4. At the temperature of 1280° C., the critical molar ratio is, as can be seen from the drawing, about between 0.3 and 0.4; at a temperature of 1520° C. it is in the neighborhood of about 0.22, and at a temperature of 1780° C., about 0.17. At 2100° C. the critical value is about 0.12. Of course a silicon carbide carrier rod may be used in lieu of the silicon carrier rod.

We claim:

1. A method of preparing bodies of highly purified semiconductor material for the manufacture of electronic semiconductor devices, in which semiconductor material is precipitated upon an electrically heated body of the same semiconductor material from a flowing mixture of a gaseous compound of the semiconductor material, and a gaseous reducing agent, the flowing mixture contacting said heated body, which comprises employing as said heated body a monocrystalline silicon rod, which has its (111) axis oriented in the direction of the rod axis, a surface layer up to 0.2 mm. thickness being removed from the rod by treatment with a mixture of silicon tetrachloride and hydrogen in a mole ratio of silicon tetrachloride to hydrogen greater than 0.3 at a rod temperature above 1200° C., subsequently the rod being thickened by treatment with a mixture of the same substances having a mole ratio less than 0.3, at a rod temperature between 1000 and 1350° C.

2. A method of preparing bodies of highly purified semiconductor material for the manufacture of electronic semiconductor devices, in which semiconductor material is precipitated upon an electrically heated body of the same semiconductor material from a flowing mixture of a gaseous compound of the semiconductor material, and a gaseous reducing agent, the flowing mixture contacting said heated body, which comprises employing as said heated body a monocrystalline silicon rod, which has its (111) axis oriented in the direction of the rod axis, a surface layer of up to 0.2 mm. thickness being eliminated from the rod by treatment with a mixture of silicochloroform and hydrogen in a mole ratio of the silicochloroform to the hydrogen greater than 0.5, at a temperature above 1200° C., with an admixture of steam, and subsequently the rod being thickened by treatment with a mixture of the same substances, without steam, in a mole ratio smaller than 0.5 at a rod temperature between 900 and 1350° C.

3. A method of removing a predetermined surface layer from bodies of highly purified semiconductor silicon material for the manufacture of electronic semiconductor devices which comprises precipitating semiconductor siilcon upon an electrically heated body of semiconductor silicon from a flowing mixture of $SiCl_4$ and $H_2$, the flowing mixture contacting said heated body, changing the reaction conditions so that by reaction with the flowing mixture, the surface layer of the semiconductor body is removed, the change in reaction conditions consists in at least one of the following: an increase in the temperature of the semiconductor body to a temperature above 1200° C., and an increase in molar ratio of $SiCl_4$ to $H_2$, to above 0.3, to cause the semiconductor substance to be removed from the body.

4. A method of removing a predetermined surface layer from bodies of highly purified semiconductor silicon material for the manufacture of electronic semiconductor devices which comprises precipitating semiconductor silicon, upon an electrically heated body of semiconductor silicon, from a flowing mixture of $SiHCl_3$ and $H_2$, the flowing mixture contacting said heated body, changing the reaction conditions so that by reaction with the flowing mixture, the surface layer of the semiconductor body is removed, the change in reaction conditions consists in at least one of the following: an increase in the temperature of the semiconductor body to a temperature above 1200°, and an increase in molar ratio of $SiHCl_3$ to $H_2$, to above 0.5, to cause the semiconductor substance to be removed from the body.

5. A method of removing a predetermined surface layer from bodies of highly purified semiconductor germanium material for the manufacture of electronic semiconductor devices, which comprises precipitating semiconductor germanium upon an electrically heated body of semiconductor germanium, from a flowing mixture of germanium tetrachloride and hydrogen, the flowing mixture contacting said heated body, changing the reaction conditions so that by reaction with the flowing mixture the surface layer of he semiconductor body is removed, the change in reaction conditions consisting in at least one of the following: an increase in the temperature of the semiconductor body above 900° C. and an increase in molar ratio of germanium tetrachloride to hydrogen to above about 0.42 to cause semiconductor substance to be removed from the body.

6. A method of removing a predetermined surface layer from bodies of highly purified semiconductor silicon carbide semiconductor material for the manufacture of electronic semiconductor devices, which comprises precipitating semiconductor silicon carbide upon an electrically heated body of semiconductor silicon carbide, from a flowing mixture of monomethyl trichlorosilane and hydrogen, the flowing mixture contacting said heated body, changing the reaction conditions so that by reaction with the flowing mixture, the surface layer of the semiconductor body is removed, the change in reaction conditions consisting in at least one of the following: an increase in the temperature of the semiconductor body to a value above 1280° C., and an increase in molar ratio of monomethyl trichlorosilane to hydrogen to above about 0.12 to cause the semiconductor substance to be removed from the body.

References Cited by the Examiner

UNITED STATES PATENTS

| | | | |
|---|---|---|---|
| 2,744,000 | 5/56 | Seiler | 156—7 |
| 2,840,489 | 6/58 | Kempter et al. | 117—106 |
| 2,841,477 | 7/58 | Hall | 156—7 |
| 3,099,534 | 7/63 | Schweickert et al. | 23—223.5 |

FOREIGN PATENTS

| | | |
|---|---|---|
| 1,029,941 | 5/58 | Germany. |

EARL M. BERGERT, *Primary Examiner.*

JOSEPH STEINBERG, *Examiner.*